United States Patent [19]
Kamejima et al.

[11] 4,314,454
[45] Feb. 9, 1982

[54] METHOD OF OPERATING REFRIGERATING MACHINE

[75] Inventors: Kohji Kamejima; Minoru Kano; Hideki Tanaka; Toshihiko Fukushima, all of Shimoinayoshi, Japan

[73] Assignee: Hitachi, Ltd., Tokyo, Japan

[21] Appl. No.: 164,945

[22] Filed: Jul. 1, 1980

[30] Foreign Application Priority Data

Jul. 4, 1979 [JP] Japan .................................. 54/83984

[51] Int. Cl.³ .......................... F25D 3/00; F25D 17/02
[52] U.S. Cl. .......................................... 62/98; 62/201; 165/18
[58] Field of Search .................. 62/59, 98, 99, 185, 62/201; 165/18

[56] References Cited

U.S. PATENT DOCUMENTS

3,653,221  4/1972  Angus ........................................ 62/59
4,129,014  12/1978  Chubb .................................. 62/59 X
4,253,309  3/1981  Abrahamsson ..................... 62/98 X Primary Examiner—William E. Wayner
Attorney, Agent, or Firm—Craig and Antonelli

[57] ABSTRACT

In a refrigerating and air-conditioning system provided with a heat storage tank, variation patterns of load and weather conditions are predicted. On the basis of the predicted values, optimum outputs of a refrigerating machine at individual time points within a predetermined operation period are determined for possible water temperatures of the heat storage tank and stored in a memory. In accordance with the actual water temperature of the heat storage tank, the optimum output of the refrigerating machine is retrieved from the memory and utilized for the operation thereof.

1 Claim, 6 Drawing Figures

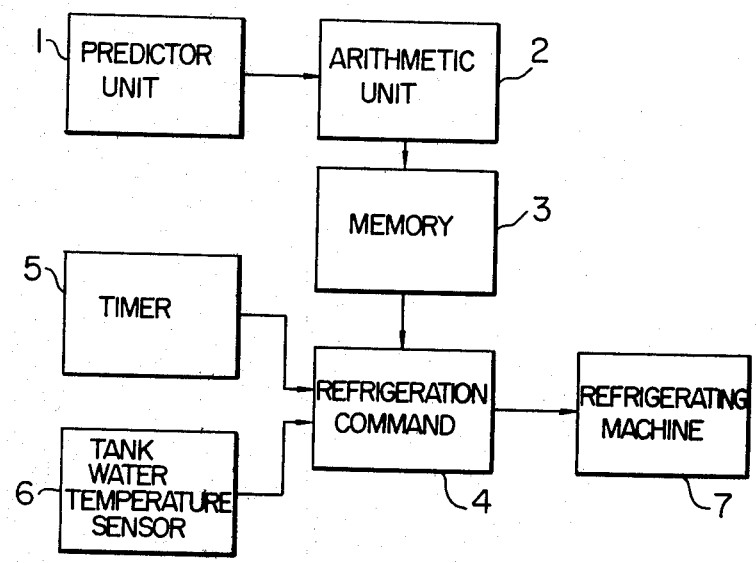

METHOD OF OPERATING REFRIGERATING MACHINE

BACKGROUND OF THE INVENTION

1. Field of the Invention

The present invention relates to a method of operating a refrigerating machine in a refrigerating and air-conditioning system which can be made use of in buildings and warehouses for air-conditioning and refrigeration.

2. Description of the Prior Art

Usually, in a refrigerating and air-conditioning system, there is employed a refrigerator or refrigerating machine having a capacity which is smaller than the maximum value of the load to be conditioned by the system, with a view to decreasing cost for equipment and maintenance as well as reducing contract demand. To this end, the refrigerating machine or refrigerator is generally sperated in a manner illustrated in FIGS. 1, 2 and 3, by way of example, wherein FIG. 1 is a view to illustrate variation in the load of the refrigerating and air-conditioning system during a period from the start of the air-conditioning operation to the end thereof, and FIGS. 2 and 3 illustrate variations in the quantity of accumulated heat and output power of the refrigerating machine, respectively, during operation of the refrigerating machine. It is obvious that the load $Q_L$ is effective over a time span between the the initiation of the air-conditioning operation at a time point $t_{S1}$ and the termination thereof at a time point $t_{S2}$. As can be seen from FIG. 1, since the maximum value of the load $Q_L$ exceeds the maximum value $Q_{R\ MAX}$ of the output $Q_L$ of the refrigerating machine, energy for the air-conditioning will become insufficient by an amount which corresponds to a sum $(S_1 + S_3 - S_2)$ of integrals $S_1$, $S_2$ and $S_3$ shown in FIG. 1. In an effort to evade such shortage, it is common in practice to start the operation of the refrigerating machine at a time point $t_{S1}'$ which is earlier than the time point $t_{S1}$, as is illustrated in FIGS. 2 and 3, to thereby accumulate energy for the air-conditioning in a heat storage tank by an amount as predicted. Thus, the refrigerating machine is operated in a manner illustrated in FIG. 3. In this connection, it will be noted that selection of a refrigerating machine the maximum output $Q_{R\ MAX}$ of which is relatively low for the purpose of reducing the equipment cost will in turn involve the necessity for installing a heat storage tank of a correspondingly increased capacity. Inversely, when a heat storage tank of a relatively small capacity is used, a refrigerating machine having a correspondingly increased maximum output $Q_{R\ MAX}$ has to be employed, which means of course a corresponding increase in the equipment cost. under the circumstance, the refrigerating machine having an appropriate maximum output $Q_{R\ MAX}$ is in practice selected as a compromise between the equipment cost and the capacity of the heat storage tank. In the case of the operating method illustrated in FIGS. 1, 2 and 3, it should however be noted that the refrigerating machine is always under operation during the time span in which the load to be conditioned is alive, as the result of which the refrigerating machine has to be operated at the maximum output level whenever the load is at maximum. By the way, in the cooling operation made of the refrigerating and air-conditioning system, the time period during which the air-conditioning load is high will coincide with a time period in which an ambient wet-bulb temperature is high, which means that the refrigerating machine is put into operation when the temperature of cooling water of the refrigerating machine is high, i.e. when the coefficient of performance of the refrigerating machine is low. Thus, the conventional operating method of the refrigerating machine is disadvantageous in that the operating cost for the refrigerating and air-conditioning system is considerably increased.

A Japanese patent publication No. 46501/'72 discloses another type of refrigerating system in which the refrigerating machine is operated at night to accumulate a predetermined amount of heat and, at the same time, an amount of heat to be used on that day is predicted. When the predictive heat amount is larger than the accumulated heat amount, the refrigerating machine is operated by using surplus power in the day time to compensate for the insufficient amount of the heat.

SUMMARY OF THE INVENTION

An object of the present invention is therefore to provide a refrigerating and air-conditioning system which is operable at a low operating cost and free from the above-mentioned disadvantages of the prior art system.

In view of the above and other objects which will become apparent as description proceeds, there is provided according to an aspect of the invention a refrigerating and air-conditioning system provided with a heat storage tank, in which the refrigerating machine is operated in such manner that temperature of water in the heat storage tank is lowered at a maximum rate when the water temperature in the heat storage tank exceeds a predetermined upper limit, while the refrigerating machine is so operated as to reduce an integrated electric power to minimum when the water temperature in the heat storage tank is not higher than the upper limit.

BRIEF DESCRIPTION OF THE DRAWINGS

FIGS. 1 to 3 are view to illustrate a hitherto known method of operating a refrigerating machine of a refrigerating and air-conditioning system, wherein FIG. 1 illustrates graphically variation in load over a time span between the start and the end of the air-conditioning operation, and FIGS. 2 and 3 illustrate variations in the quantity of accumulated heat and output of the refrigerating machine, respectively, during the operation thereof.

FIG. 4 shows schematically in a block diagram an arrangement of a refrigerator control apparatus for carrying out a method of operating a refrigerating machine of a refrigerating and air-conditioning system according to an embodiment of the invention.

FIG. 5 illustrates an arrangement of a memory employed in the apparatus shown in FIG. 4.

DETAILED DESCRIPTION OF THE PREFERRED EMBODIMENTS

Now, a typical example of a refrigerator operating method according to the invention will be described by referring to FIGS. 4 to 6.

Figure 1:
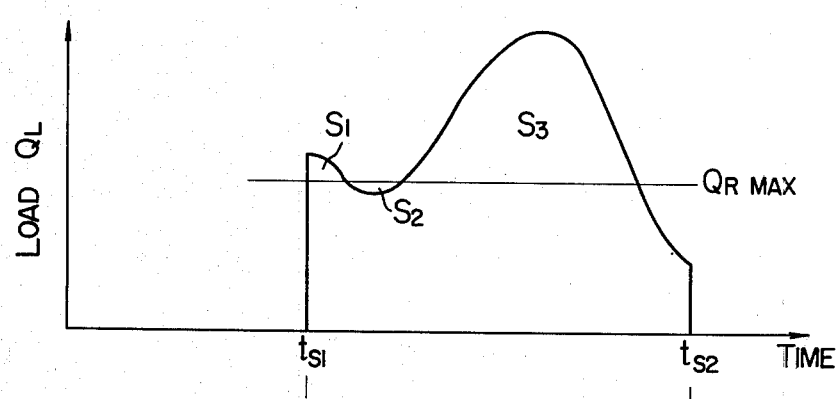
Figure 2:
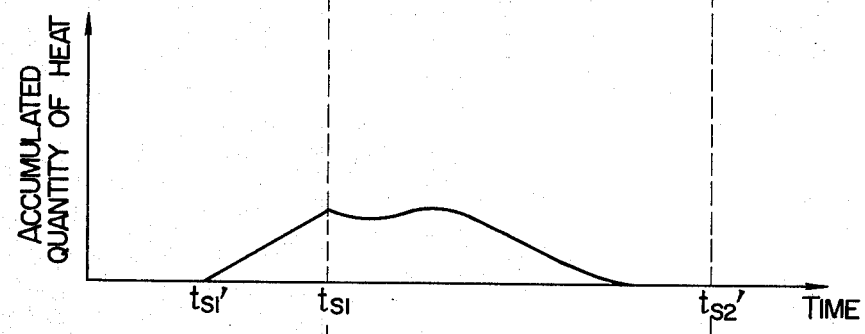
Figure 3:
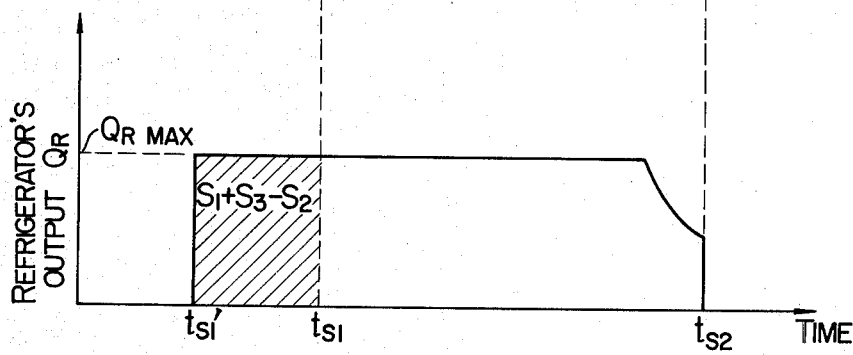

In FIG. 1 which shows in a block diagram an arrangement of a refrigerator control apparatus according to an embodiment of the invention, reference numeral 1 denote a predictor unit which serves to predict a variation pattern of a load to be air-conditioned over a time span between the start and the end of the air-conditioning operation as well as a variation pattern of weather conditions such as wet-bulb temperature or the like over a time span between the start of the refrigerating operation and the termination of the air-conditioning operation on a day scheduled for operation of the refrigerating machine. The prediction is effected for every predetermined time period, e.g. every 24 hours. On the basis of the results of the prediction, an arithmetic unit 2 determines operation mode of the refrigerating machine at every predetermined time point within the time span or period during which the refrigerating machine is to be operated. The operation modes of the refrigerating machine thus determined are stored in a memory 3. On the other hand, a refrigerating operation command unit 4 responds to a time signal produced from a timer 5 and a signal representing a measured water temperature of the refrigerating machine as produced from a tank water temperature sensor 6 for measuring the temperature of water in the heat storage tank, to thereby retrieve an appropriate refrigerating operation command signal from the memory 3 and send the command signal to a refrigerating machine 7. FIG. 5 shows various refrigerating operation command signals stored in the memory 3. In this figure, $t_0$ and $t_f$ represent the time points at which the refrigerating machine control is to be initiated and terminated, respectively. Symbols $T_0$, $T_1$, $T_2$ ... $T_{N-1}$ and $T_N$ represent possible temperature values of water in the heat storage tank.

As can be seen from FIG. 5, various refrigerating operation signals $Q_R'$ are stored in the memory 3 shown in FIG. 4 in a form of table in which time t is taken along the abscissa with the tank water temperature T being taken along the ordinate. Thus, the refrigerating operation command unit 4 can retrieve offhand an appropriate refrigerating operation command signal $Q_R'$ (t, T) from the memory in accordance with the tank water temperature signal T produced from the tank water temperature sensor 6 and the time signal t generated by the timer 5.

Next, description will be made on the calculating procedures executed by the arithmetic unit 2. In the first place, an upper limit T for the tank water temperature is determined. The value of the upper limit temperature T' may be a fixed value or alternatively given as a function of time t or as a function of a predicted value of the load to be air-conditioned.

The refrigerator output $Q_R'(t_f, T)$ at a time point $t_f$ is determined through the procedures described below:

Procedure 1-0: Carried over cost u(T) (carried-over power rate) is determined as a function of the water temperature T of the heat storage tank in accordance with the following expression:

$$u(T) = C \cdot (T - T_0)/f \ldots \quad (1)$$

where C represents heat capacity of the heat storage tank, $T_0$ represents a reference value for the water temperature at the heat storage tank, and f represents the coefficient of performance of the refrigerating machine. The value of f may be the one which corresponds to the rated power or average load rate of the refrigerating machine. The function u(T) represents the operation or running cost involved by the load of the refrigerating machine which is carried over to the next day after the operation of the refrigerating machine up to the time point $t_f$.

Procedure 1-1: Integrated cost (power rate) $F_{tf}(Q_R, T)$ at the time point $t_f$ for various tank water temperatures T and refrigerator's output powers $Q_R$ is calculated in accordance with the following expression:

$$E_{tf}(Q_R, T) = W(Q_R, T) + u\left(T + \frac{L_{tf} - Q_R}{C}\right) \quad (2)$$

where W represents the energy cost ascribable to consumption of electric power, gas or the like by the refrigerating machine, pumps and the like associated parts, and $L_{tf}$ represents the predicted value of the air-conditioning load at the time point $t_f$.

Procedure 1-2: So long as the water temperature T at the heat storage tank remains below the upper limit T', the output power $Q_R$ of the refrigerating machine which can reduce the integrated cost $F_{tf}(Q_R, T)$ derived in accordance with the expression (2) to a minimum is selected as an optimum refrigerator output power $Q_R'(t_f, T)$ at the time point $t_f$. On the other hand, when the water temperature T of the heat storage tank exceeds the upper limit T', then the rated power of the refrigerating machine is selected as the optimum refrigerator output power $Q_R'(t_f, T)$ at the time point $t_f$.

Procedure 1-3: Integrated cost (power rate) $F_{tf}[Q_R'(t_f, T)T]$ for the optimum refrigerator output power $Q_R'(t_f, T)$ determined through the procedure 1-2 is decided as a minimum integral cost $V(t_f, T)$ at the time $t_f$ which is defined as follows:

$$V(t_f, T) = W[Q_R'(t_f, T)T] + u\left(T + \frac{L_{tf} \cdot Q_R'(t_f, T)}{C}\right) \quad (3)$$

In this manner, the optimum output power $Q_R'(t_f, T)$ of the refrigerating machine at the time point $t_f$ for the given water temperature T of the heat storage tank can be determined.

In succession, the output of the refrigerating machine at a time point $t_{f-1}$ is determined.

Procedure 2-1: The integrated cost $F_{tf-1}(Q_R, T)$ for a given tank water temperature T and refrigerator output $Q_R$ at the time point $t_{f-1}$ is calculated in accordance with the following expression:

$$F_{tf-1}(Q_R, T) = W(Q_R, T) + V\left(t_f, T + \frac{L_{tf-1} - Q_R}{C}\right) \quad (4)$$

where V represents the minimum integrated cost at the time point $t_f$ determined through the procedure 1-3.

Procedure 2-2: Provided that the water temperature T of the heat storage tank remains below the upper limit temperature T' and that a temperature $\tilde{T}$ defined by an expression (5) stated below does not exceed the upper limit T' of the heat storage tank, the refrigerator output $Q_R$ which minimizes the value determined in accordance with the expression (4) is selected as an optimum refrigerator output power $Q_R'(t_{f-1}, T)$ at the time point $t_{f-1}$. On the other hand, when the tank water temperature T exceeds the upper limit T' or when the temperature $\tilde{T}$ defined below rises beyond the upper limit T', the rated power of the refrigerating machine is defined as the optimum refrigerator output $Q_R'(t_{f-1}, T)$ at the time point $t_{f-1}$. The temperature $\tilde{T}$ represents the water temperature of the heat storage tank which will be reached after lapse of a predetermined transit time interval, when the refrigerating machine is operated at the output $Q_R$, and can be mathematically expressed as follows:

$$\tilde{T} = T + \frac{L_{tf-1} - Q_R}{C} \quad (5)$$

Procedure 2-3: The integrated cost $F_{tf-1}[Q_R'(t_{f-1}, T)T]$ for the optimum refrigerator output $Q_R'(t_{f-1}, T)$ determined through the procedure 2-2 is defined as the minimum integral cost $V(t_{f-1}, T)$ at the time point $t_{f-1}$ in accordance with the following expression:

$$V(t_{f-1}, T) = W[Q_R'(t_{f-1}, T)T] + V\left[t_f, \frac{L_{tf} - Q_R'(t_{f-1}, T)}{C}\right] \quad (6)$$

Through the procesures 2-1, 2-2 and 2-3 described above, the optimum refrigerator output $Q_R'(t_{f-1}, T)$ and the minimum integrated cost $V(t_{f-1}, T)$ at the time point $t_{f-1}$ can be determined for the given water temperature of the heat storage tank. Subsequently, the optimum refrigerator outputs at time points $t_{f-2}, t_{f-3}, t_{f-4}, \ldots$, to can be determined by repeating the procedures 2-1 to 2-3 with time being successively shifted backwards by the predetermined transit time interval.

Figure 6:
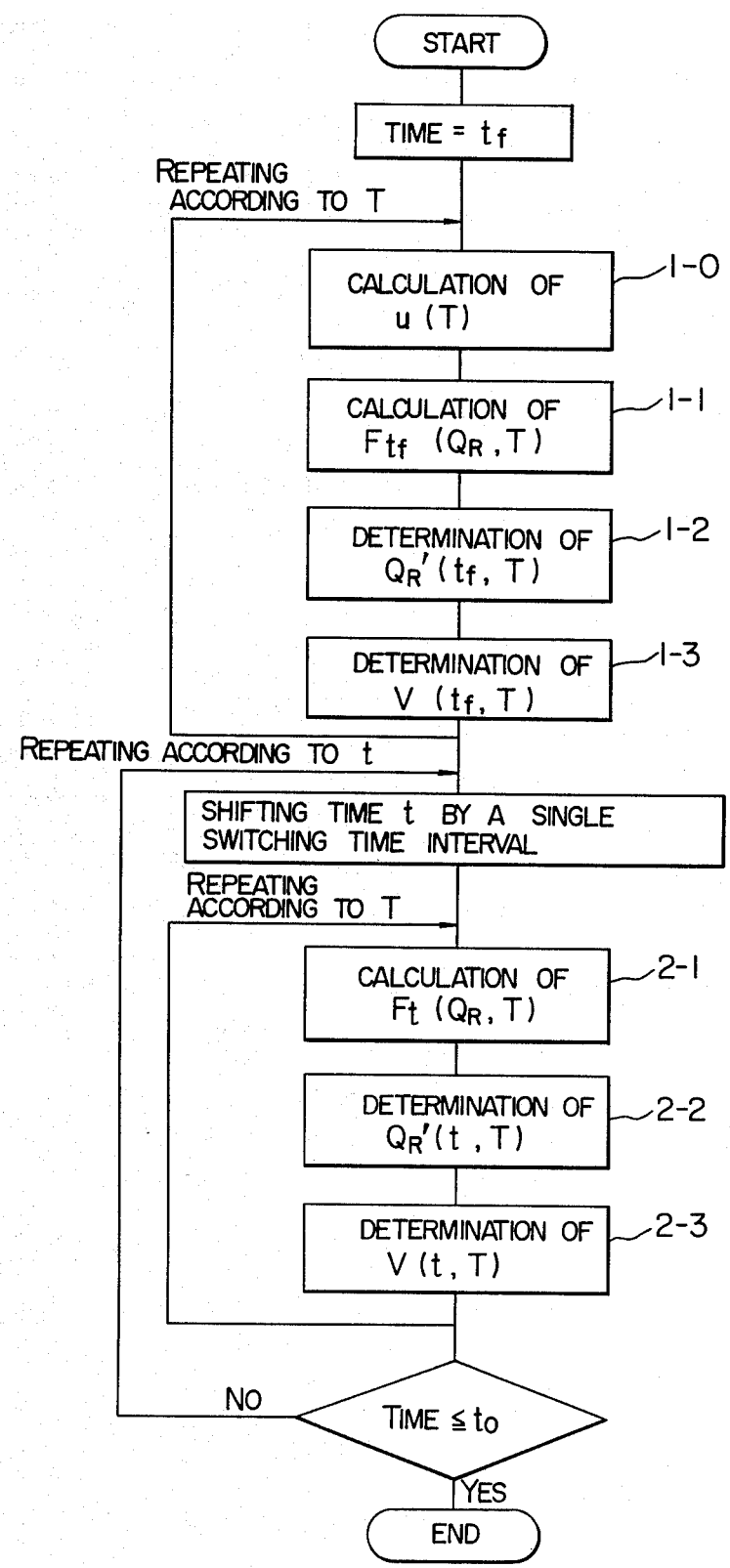
FIG. 6 shows a flow chart to illustrate operational procedures executed by an arithmetic unit according to the invention.

FIG. 6 illustrates generally the calculating procedures executed by the arithmetic unit 2 in carrying out the refrigerator operating method according to the invention.

As will be appreciated from the foregoing description, the refrigerator operating method according to the invention in which the refrigerator output at predetermined time points or intervals within a predetermined operation period of the refrigerating machine are so selected that the integral cost for the refrigerator operation can be reduced to a minimum allows the refrigerating and air-conditioning system equipped with a heat storage tank to be operated at a significantly reduced operation and maintenance cost.

We claim:

1. A method of operating a refrigerating machine of a refrigerating and air-conditioning system which includes predicting means for predicting variations in load to be conditioned and weather conditions on a day scheduled for operation of said refrigerating machine, a heat storage tank for storing energy output produced from said refrigerating machine, and means for measuring water temperature of said heat storage tank, said method comprising the steps of determining previously output powers of said refrigerating machine at individual time points within a predetermined operation period for possible values of said water temperature on the basis of predicted values of said load to be conditioned and said weather conditions; storing the thus determined output powers of said refrigerating machine in memory means; retrieving optimum output of said refrigerating machine from those stored in said memory means on the basis of actual water temperature of said heat storage tank at any given one of said individual time points within said operation period; and producing an operation command to said refrigerating machine which corresponds to said retrieved optimum output, wherein when said actual water temperature of said heat storage tank is higher than an upper limit value of said water temperature which is compatible with the load to be conditioned or when said actual water temperature is likely to rise beyond said upper limit value at any given time point, said refrigerating machine is operated under full-load condition, while when said actual water temperature of said heat storage tank is not higher than said upper limit value, said refrigerating machine is so operated that a sum of an integrated value of electric power consumed by said refrigerating machine and associated auxiliary equipments during said operation period and electric power carried over to the next day can be reduced to a minimum.

* * * * *